United States Patent [19]
Kanbel et al.

[11] 3,754,437
[45] Aug. 28, 1973

[54] TORQUE LOADING DEVICE

[75] Inventors: Horst Kanbel, Monheim-Baumberg;
Lothar Saemann, Dusseldorf;
Manfred Baumgarten, Langenfeld,
all of Germany

[73] Assignee: Aviatest GmbH, Dusseldorf,
Germany

[22] Filed: Nov. 19, 1971

[21] Appl. No.: 200,497

[30] Foreign Application Priority Data
Nov. 21, 1970 Germany............. P 20 57 347.1

[52] U.S. Cl........................ 73/99, 73/67.3, 73/118
[51] Int. Cl. ............................................. G01n 3/36
[58] Field of Search.................. 73/99, 118, 136 D, 73/162, 67.3

[56] References Cited
UNITED STATES PATENTS
2,935,869    5/1960    Shipley ........................ 73/136 D
3,561,261    2/1971    Conniff et al.................. 73/71.5 X

*Primary Examiner*—Jerry W. Myracle
*Attorney*—Craig, Antonelli and Hill

[57] ABSTRACT

An installation for testing rotating workpieces as regards their behavior at different rotational speeds and different torque loads of a test program by means of an electric driving and braking motor and by means of a hydraulic coupling, in which the rotor of the motor preferably constructed as D.C. machine is rigidly connected with one of the coupling parts, and in which a control installation is provided for loading the coupling with torque shocks of such frequency, with respect to which the motor acts as flywheel, and for loading the motor with torque changes of a frequency lying below the same.

7 Claims, 1 Drawing Figure

Patented Aug. 28, 1973 3,754,437
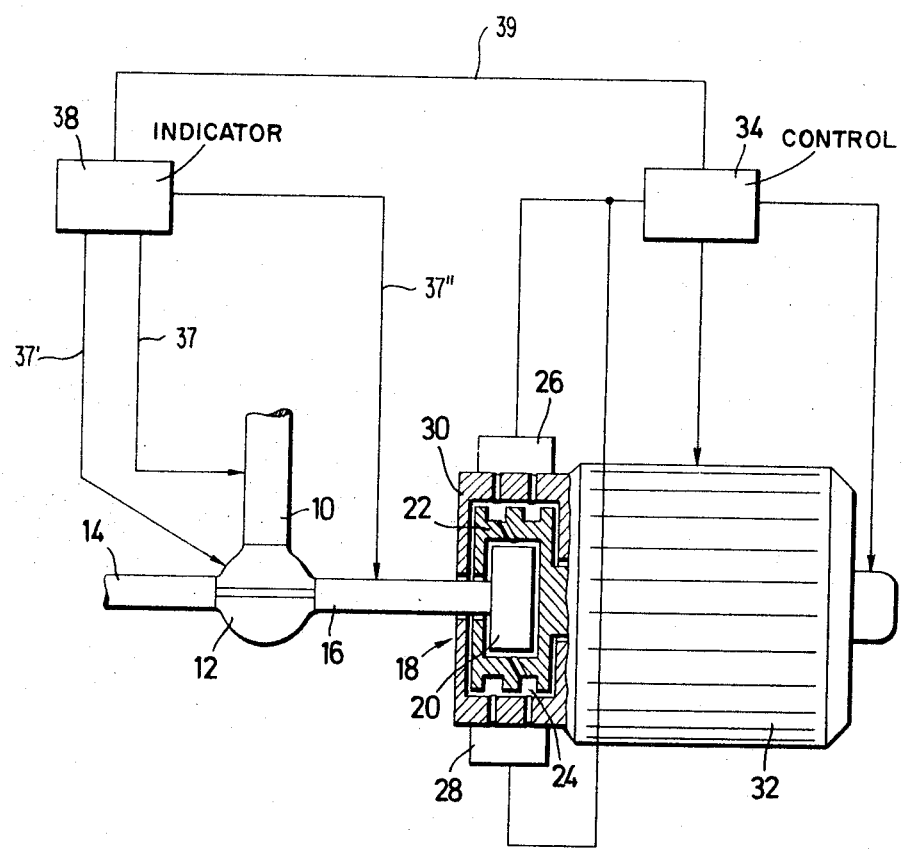

TORQUE LOADING DEVICE

The present invention relates to an apparatus for testing rotating workpieces as regards their behavior at different rotational speeds and torques.

Such types of installations are needed in order to study the behavior of the most varied machine elements under simulated operating conditions. For example, joint shafts, transmissions, vehicle axles and turbine rotors should be mentioned as typical machine elements requiring such testing.

It is known to connect the test piece between a drive unit and a brake unit for the purposes of the torque-loading of such parts and the examination of their behavior and of detecting the transmitted torque by means of strain gauges. The change of the transmitted torque takes place very frequently in that the brake aggregate is constructed as electric generator or "brake motor" whose braking moment is adapted to be influenced electrically. The produced electric power can then be fed back into the local electric power supply network.

However, only relatively slow torque changes can be realized by means of such a prior art arrangement, and the larger the power to be transmitted and therewith the brake motor, the slower the torque change has to take place by reason of the increasing inertia of the motor.

One utilizes so-called rotary cylinders or equivalent hydraulic couplings for the examination and testing under relatively rapid, shock-like-torque loads. The test piece is then connected with a rotary piston which is supported by way of a hydraulic fluid column against partition walls of the rotary cylinder. The rotary cylinder is fixedly mounted, and the pressure of the hydraulic fluid column can be increased or decreased shock-like, i.e., suddenly, by way of controlled valves. Such types of testing installations are already commercially available. It is possible by means of such an installation to apply loads to rotating test pieces also in a shock-like manner. One then has to connect the test piece with the rotary piston and permit the rotary cylinder to rotate along; the feed of the hydraulic fluid into the chambers of the rotary cylinder then takes place by way of valves in an outer housing which lead to corresponding annular lines connected with the chambers. In order that the test produces suitable values, the rotary cylinder has to have a high inertia relative to the rotary piston in order that the hydraulic column can "support" itself; an elastic yielding of the rotary cylinder would cause errors in the test. Consequently, the rotary cylinder must be connected with a flywheel mass in order to provide as large as possible a moment of inertia. This, however, leads to difficulties if additionally also the rotary speed must be changeable rapidly because the flywheel mass prevents the same and therewith the torque would be influenced non-permissively. Therebeyond, only a relatively rapid torque change could be detected in this manner since even a flywheel with very large inertia would follow without difficulty slow torque changes.

The aim of the present invention resides in providing an installation of the aforementioned type which includes both an electric driving and braking motor (the motor must also be able to act drivingly in order that "negative" torques can be applied to the test piece) and also a hydraulic coupling, by means of which installation test pieces can be reliably loaded with all rotary speeds and torques occurring in actual operation so that their behavior is readily measurable with good results. Heretofore, as mentioned hereinabove, one could apply loads only within certain limits.

As a typical example, the following specifications for an installation are given:

In the rotational speed range $n=0$ to $500$ min$^{-1}$
torques of $Md=0$ to $250$ kpm
with superimposed shocks of $Md=\pm 50$ kpm
at frequencies of $f=0$ to $150$ Hz.
In the rotational speed range $n=500$ to $2,000$ min$^{-1}$
$Md=0$ to $70$ kpm with the same torque superimposition.

The underlying problems are solved according to the present invention in that the rotor of the motor constructed as D.C. machine is rigidly connected with one of the coupling parts and that an installation is provided for loading the coupling with torque shocks of such frequency, with respect to which the motor acts as flywheel, and for loading the motor with the torque changes of a frequency lying below such frequency. The coupling is thereby generally constructed in the manner described above which is known as such.

The term "rigid" of course does not mean that the connecting parts are absolutely inelastic because it is not realizable in practice, though this would, according to the present invention, be the ideal case. This ideal case can be reached always only approximately. For that reason, even if the coupling is a rotary cylinder, one will connect the rotary piston with the test piece and the cylinder itself with the motor because the connection takes place in that case not by way of a relatively thin shaft but instead by way of massive and therewith rigid structural parts. The more rigid the connection, the smaller is the danger of undesirable coupling oscillations. Such coupling oscillations would be unavoidable, for example, with the connection by way of even only short hydraulic lines by reason of the compressibility of the hydraulic fluid which increases with higher pressure. With a mechanical rigid connection, however, the frequencies of any possible coupling oscillations lie above the operating frequency range. Therebeyond the rotary cylinder housing possesses a higher moment of inertia than the rotary piston whereby the flywheel mass is increased in an advantageous manner.

A direct current motor is preferred according to the present invention because its rotor possesses a considerably larger moment of inertia than, for example, that of an asynchronous machine. With the latter the control from negative to positive slippage is possible only with considerable expenditures, which transition from braking to driving operation, however, should take place shock-free for the instant case.

In order to be able to apply the considerable torque variations with the requisite frequency of 150 Hz to the rotary cylinder, according to a further feature of the present invention, several synchronously controllable valves are provided in the housing thereof. Even though one could also utilize a single larger valve to enable the required mass flow, the control of such a large valve would be too sluggish. On the other hand, the valves must be located as close as possible to the housing in order to keep the hydraulic fluid column as small as possible and therewith as rigid as possible.

The values indicated hereinabove as a typical example correspond to a power to be transmitted of about 180 Hp. One will attempt to so select the motor that it suffices for this power but is not oversized, i.e., one will select approximately a 150 KW motor. With such a motor, the "boundary frequency", i.e., the frequency up to which the torque change can be imposed on the motor, lies at about 5 Hz, if it is a D. C. motor. One loads the motor with the frequencies lying therebelow; very high frequencies could be permitted or tolerated because the mechanical and electrical inertia of the motor prevents the rotor from following rapid changes.

The rotary cylinder, on the other hand, transmits the entire torque; it stresses the test piece with respect to the motor. The angle of rotation between cylinder and piston is constructively limited, for example, to 30°. If the test piece is very elastic, the entire torque range is limited thereby. Only those torque shocks lying above 5 Hz are applied to the rotating cylinder, at which the motor is effective as flywheel mass. At slower torque changes, the rotor of the motor would follow.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic view of a test installation in accordance with the present invention.

The apparatus according to the present invention which is illustrated in the single FIGURE is constructed as control circuit in which a predetermined test program serves as guide magnitude and in which the respective measured torques and rotational speeds are readjusted to the values predetermined by the program.

Referring now to the single FIGURE of the drawing, the rear axle construction of a motor vehicle serves as test piece, of which one can recognize the cardan shaft 10, the differential gear 12 and the joint shafts 14 and 16 normally leading to the rear wheels to be driven. The installation according to the present invention is illustrated connected to the joint shaft 16; a similar installation is also connected with the joint shaft 14 in a manner not illustrated herein.

Measuring lines 37, 37' and 37'' lead from the cardan shaft 10 as well as from the gear parts and joint shafts to an indicating and evaluating apparatus designated by reference numeral 38 of conventional construction. Since the test set-up, measurement pick-ups and processing of the measured values are of conventional nature, utilizing commercially available parts and thus form no part of the present invention, a detailed description and showing thereof is dispensed with herein. In general, one utilizes strain gauges for the detection of the torques and pulse transmitters or pulse pick-ups for the detection of the rotational speeds.

The measured values represent the "existing" condition and are fed back by way of a feedback line 39 to a control installation 34. Since the control installation 34 is also of conventional type and forms no part of the present invention, a detailed description thereof is dispensed with herein, except to the extent necessary for an understanding of the present invention.

The installation according to the present invention includes a hydraulic coupling generally designated by reference numeral 18 in the form of a rotary piston 20 which is seated sealed within a rotary cylinder 22. The rotary piston 20 is connected with the joint shaft 16 by way of a safety clutch of conventional construction (not shown) which in case of disturbances or breakdowns renders the installation inoperable. However, the safety clutch or coupling can also be built into the rotary cylinder 22; since it forms no part of the present invention, it is not described in greater detail. The rotary piston 20 can lead or lag with respect to the rotary cylinder 22 by about 30°; both parts 20, 22 of the coupling 18 are connected with each other by a hydraulic fluid column which is disposed in four chambers between two vanes of the rotary piston and radial partition walls of the rotary cylinder. The chambers are connected by way of schematically illustrated annular lines 24 with the outlet of several valves of conventional construction of which the valves 26 and 28 can be seen in the drawing where they are only schematically shown. The annular channels 24 and the valves are arranged in or at a fixed outer housing 30. The rotary cylinder 22 itself rotates in unison with the rotary piston 20. The rotary cylinder 22 is rigidly connected with the rotor of a D.C. motor 32; however, it would also be possible to construct the rotary cylinder 22 itself as rotor of the D.C. motor 32, even though the construction of the illustrated embodiment would appear to be more appropriate. The rotor or armature of the electric motor 32 is connected with the control apparatus 34, whereby the valves such as valves 26 and 28 of the coupling 18 are also controlled by control apparatus 34 in a conventional manner, known as such. These valves are therefore constructed, e.g., as conventional solenoid valves or the like. Hydraulic fluid under high pressure exists at the inlet side of the valves.

The control apparatus 34 supplies current to the armature of the motor 32—or removes current therefrom—according to a program which determines the individual test conditions. The comparison of the intended values predetermined by the program with the existing values fed-back to the control apparatus 34 takes place in the usual, known manner and is, therefore, not described in detail herein. Commercially available devices utilizing, for example, conventional logic circuits are used for that purpose.

In testing a rear axle unit, for example, the joint shaft has to be loaded both in the driven condition as also under conditions, under which it acts itself drivingly back on the differential gear, for example, as occurs when driving downhill. The magnitudes of rotational speed, torque, engine output and further variables are thereby interlinked. The test program contains only one of these variables, preferably the torque, whereas the associated rotational speed will be varied on the drive side (not shown) of the cardan shaft 10.

Establishing a program which corresponds to the loads actually occurring in operation is left to the user of the installation. This program can be stored, for example, on punched tapes or on magnetic tapes and is converted by means of the usual installations into "intended" values for the control apparatus 34. The control itself forms no part of the present invention; it should only be mentioned that it utilizes conventional parts, and that the motor armature is controlled, for example, by way of thyratrons or thyristors which permits also a feedback of the brake output in the form of electrical power into the power supply system.

The control apparatus 34 also includes a frequency switch whose construction forms no part of the present invention and is conventional, in order to load the engine circuit only with such torque changes which lie below an adjustable limit frequency of, for example, 5 Hz, whereas the higher frequencies are applied to the valves. Of course, the frequency division can also take place already in establishing the program.

While we have shown and described only one embodiment in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

What we claim is:

1. An apparatus for testing rotating workpieces for their behavior at different rotational speeds and different applied torques comprising an electric driving and braking motor means, including a rotor; a hydraulic coupling means, having a part substantially rigidly connected to said rotor, for operatively coupling said rotating workpieces with said motor means; and control means, operatively connected to said motor means and said coupling means, for applying torque shocks to said coupling means at a first set of frequencies, wherein said motor means is effectively a flywheel mass, and for loading said motor means with torque changes at a lower set of frequencies than said first set of frequencies.

2. An apparatus according to claim 1, wherein the motor means is a D.C. electric motor.

3. An apparatus according to claim 1, wherein the coupling means includes a rotary cylinder substantially rigidly connected to the rotor of the motor means, and a rotary piston within said rotary cylinder substantially rigidly connected with the workpiece, said rotary piston being supported with respect to said rotary cylinder by way of a hydraulic fluid column, and wherein said coupling means further includes a housing means containing the rotary cylinder and controllable valve means for controlling the change of volume of the hydraulic fluid column operatively connected to said housing means.

4. An apparatus according to claim 3, wherein said valve means includes a plurality of synchronously controlled valve means.

5. An apparatus according to claim 4, wherein said control means includes a frequency switch means for splitting up the frequencies to be fed to the motor means and to the coupling means.

6. An apparatus according to claim 5, wherein the motor means is a D.C. electric motor.

7. An apparatus according to claim 1, wherein said control means includes a frequency switch means for splitting up the frequencies to be fed to the motor means and to the coupling means.

* * * * *